United States Patent
Konno et al.

(10) Patent No.: US 6,231,192 B1
(45) Date of Patent: May 15, 2001

(54) PROJECTING OPTICAL SYSTEM

(75) Inventors: Kenji Konno, Sakai; Kohtaro Hayashi, Toyonaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/335,023

(22) Filed: Jun. 17, 1999

(30) Foreign Application Priority Data

Jun. 23, 1998 (JP) .................................................. 10-175774

(51) Int. Cl.$^7$ .................................................. G03B 21/14
(52) U.S. Cl. ............................. 353/69; 353/31; 353/122
(58) Field of Search .............................. 353/31, 33, 34, 353/37, 69, 122; 359/583, 584, 589, 634

(56) References Cited

U.S. PATENT DOCUMENTS

| | | | | |
|---|---|---|---|---|
| 5,200,857 | * | 4/1993 | Matsushita | 359/634 |
| 5,231,431 | | 7/1993 | Yano et al. | 353/31 |
| 5,305,146 | * | 4/1994 | Nakagaki et al. | 359/634 |
| 5,490,013 | * | 2/1996 | Shimizu et al. | 359/637 |
| 5,562,334 | * | 10/1996 | Wortel | 353/69 |
| 5,820,241 | * | 10/1998 | Wortel | 353/31 |
| 5,907,373 | * | 5/1999 | Yamagishi | 348/744 |
| 5,946,054 | * | 8/1999 | Sannohe et al. | 348/745 |
| 6,046,858 | * | 4/2000 | Scott et al. | 359/634 |

FOREIGN PATENT DOCUMENTS

| | | |
|---|---|---|
| 63-116123 | 5/1988 | (JP) . |
| 63-292892 | 11/1988 | (JP) . |
| 3-78738 | 4/1991 | (JP) . |
| 3-249639 | 11/1991 | (JP) . |
| 8-334727 | 12/1996 | (JP) . |

* cited by examiner

*Primary Examiner*—William Dowling
(74) *Attorney, Agent, or Firm*—Sidley & Austin

(57) ABSTRACT

A projecting optical system has a plurality of display panels, a color integrating mirror, a projection optical system, a correcting member, and a lens member. The color integrating mirror, disposed at an angle to any of the display panels, integrates the images displayed on the display panels into a single color-integrated image by reflecting a light component covering a specific wavelength range and transmitting light components covering other wavelength ranges than the specific wavelength range. The projection optical system projects the color-integrated image onto a screen. The correcting member, disposed within the projection optical system, corrects the astigmatic difference caused by the color integrating mirror. The lens member, disposed on the color-integrating-mirror side of the correcting member, corrects the astigmatic difference caused by the color integrating mirror.

18 Claims, 9 Drawing Sheets

PROJECTING OPTICAL SYSTEM

This application is based on application No. H10-175774 filed in Japan, the content of which is hereby incorporated by reference.

BACKGROUND OF THE INVENTION

1. Field of the Invention

The present invention relates to a projecting optical system, and more particularly to a projecting optical system for use in a multiple-panel image projection apparatus such as a liquid crystal projector.

2. Description of the Prior Art

Recently-developed liquid crystal projectors typically adopt a multiple-panel system regardless of whether they employ transmission-type or reflection-type display panels. In such a liquid crystal projector, color integration is commonly achieved by the use of a prism having a color-integrating thin film (i.e. a dichroic prism). As an example of an image projection apparatus having transmission-type display panels in which color integration is achieved by the use of a prism, Japanese Laid-Open Patent Application No. S63-116123 proposes a display apparatus. In this display apparatus, the light emitted from a light source is separated into light components of three different colors by two dichroic mirrors. The three light components are then individually passed through separate liquid crystal light valves, and are then, through color-integrating cross dichroic prism, directed into a projecting optical system.

As another example of an image projection apparatus having reflection-type display panels in which color integration is achieved by the use of a prism, Japanese Laid-Open Patent Application No. H3-249639 proposes a liquid crystal projector. In this liquid crystal projector, the light emitted from a light source is first reflected from a polarization beam splitter and separated into light components of three different colors by a cross dichroic prism. Then, the three light components are individually modulated by being reflected from separate display panels, and are then passed through the cross dichroic prism and the polarization beam splitter once again so as to be directed into a projecting optical system.

On the other hand, image projection apparatuses are known that achieve color integration without using a prism. For example, Japanese Laid-Open Patent Application No. H3-78738 proposes an image projection apparatus that has transmission-type display panels and achieves color integration by the use of a mirror. In this image projection apparatus, the light emitted from a light source is separated into light components of three different colors by two dichroic mirrors, and the three light components are then individually passed through separate transmission-type display panels. After being modulated by the transmission-type display panels, the light components of different colors are reflected from or transmitted through each of two successively arranged color-integrating dichroic mirrors, and are then directed into a projecting optical system.

Japanese Laid-Open Patent Application No. H8-334727 proposes an image projection apparatus that has reflection-type display panels and achieves color integration by the use of a mirror. This image projection apparatus has, like that proposed by Japanese Laid-Open Patent Application No. H3-78738, two successively arranged color-integrating dichroic mirrors that individually reflect or transmit light components of different colors. However, in this image projection apparatus, light is incident on the dichroic mirrors with an incident angle of 45° or less, and the optical axes leading to the two dichroic mirrors are substantially perpendicular to each other (i.e., the plane including the optical path of the light incident on the display panels and the optical path of the light reflected therefrom with respect to one dichroic mirror is perpendicular to the corresponding plane of another dichroic mirror). U.S. Pat. No. 5,231,431 proposes, as does Japanese Laid-Open Patent Application No. H3-78738, an image projection apparatus that has transmission-type display panels and achieves color integration by the use of a mirror. However, this image projection apparatus has a cylindrical mirror for correcting astigmatic difference disposed between display panels and a projection lens system.

In general, a prism designed for color integration has a relatively large volume, and therefore a sufficiently large glass block is required to manufacture such a prism. Moreover, with such a prism, cementing needs to be carried out with extremely high accuracy. Accordingly, using a cross dichroic prism to achieve color integration, as proposed in Japanese Laid-Open Patent Applications Nos. S63-116123 and H3-249639, leads to an undesirable increase in manufacturing costs.

Moreover, using a mirror instead of a prism to achieve color integration, as proposed in Japanese Laid-Open Patent Application No. H3-78738, causes astigmatic difference in the light rays transmitted through the dichroic mirror, as in the light rays transmitted through a flat glass plate held at angle with the optical axis. This degrades the quality of the projected image. As proposed in Japanese Laid-Open Patent Application No. H8-334727, if two display panels are so disposed that the plane including the optical path of the incident light and the optical path of the reflected light with respect to one dichroic mirror is perpendicular to the corresponding plane of another dichroic mirror, the two dichroic mirrors act to cancel out each other's astigmatic difference, and thus it is possible to correct astigmatic difference. This, however, requires the display panels to be arranged in a complicated manner and thus makes it difficult to hold them in position or adjust them. In addition, the image projection apparatus as a whole needs to be made larger in height. Moreover, disposing a member for correcting astigmatic difference between display panels and a projection lens system, as disclosed in U.S. Pat. No. 5,231, 431, requires an accordingly long back focal length, and thus makes it difficult to secure sufficiently high optical performance.

SUMMARY OF THE INVENTION

An object of the present invention is to provide a compact projecting optical system that, despite using a mirror to achieve color integration, offers satisfactory imaging performance.

To achieve the above object, according to one aspect of the present invention, a projecting optical system is provided with a plurality of display panels, a color integrating mirror, a projection optical system, a correcting member, and a lens member. The color integrating mirror, disposed at an angle to any of the display panels, integrates the images displayed on the display panels into a single color-integrated image by reflecting a light component covering a specific wavelength range and transmitting light components covering other wavelength ranges than the specific wavelength range. The projection optical system projects the color-integrated image onto a screen. The correcting member, disposed within the projection optical system, corrects the astigmatic difference caused by the color integrating mirror. The lens member, disposed on the color-integrating-mirror side of the correcting member disposed within the projection optical system, corrects the astigmatic difference caused by the color integrating mirror.

According to another aspect of the present invention, a projector is provided with a light source unit, a color separating unit, a plurality of display panels, a color integrating mirror, a projection optical system, a correcting member, and a lens member. The light source unit emits white light. The color separating unit separates the white light emitted from the light source unit into a plurality of light components of different colors corresponding to different wavelength ranges. The display panels are illuminated individually by the light components of different colors thus separated. The color integrating mirror, disposed at an angle to any of the display panels, integrates the images displayed on the display panels into a single color-integrated image by reflecting a light component covering a specific wavelength range and transmitting light components covering other wavelength ranges than the specific wavelength range. The projection optical system projects the color-integrated image onto a screen. The correcting member, disposed within the projection optical system, corrects the astigmatic difference caused by the color integrating mirror. The lens member, disposed on the color-integrating-mirror side of the correcting member disposed within the projection optical system, corrects the astigmatic difference caused by the color integrating mirror.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
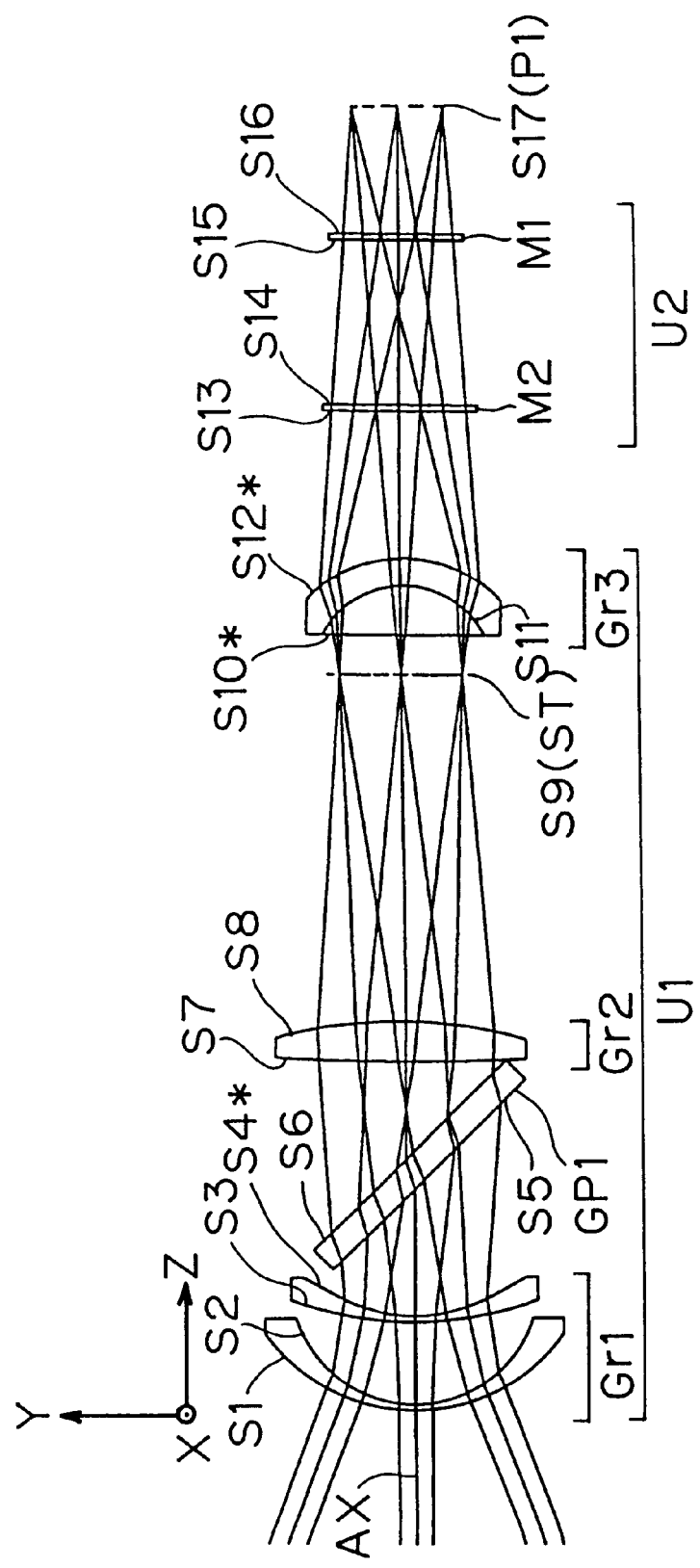
FIG. 1 is a sectional view illustrating the optical arrangement of the projecting optical system of a first embodiment (Example 1) according to the present invention.

Hereinafter, projecting optical systems embodying the present invention will be described with reference to the accompanying drawings. Note that, in the drawings, X, Y, and Z represent directions perpendicular to one another, with the direction of the optical axis (AX) of the first lens unit (Gr1) used as the Z direction. Note also that, in the following descriptions, components that play the same or corresponding roles in different embodiments will be identified with the same reference symbols and overlapping descriptions will be omitted.

Figure 2:
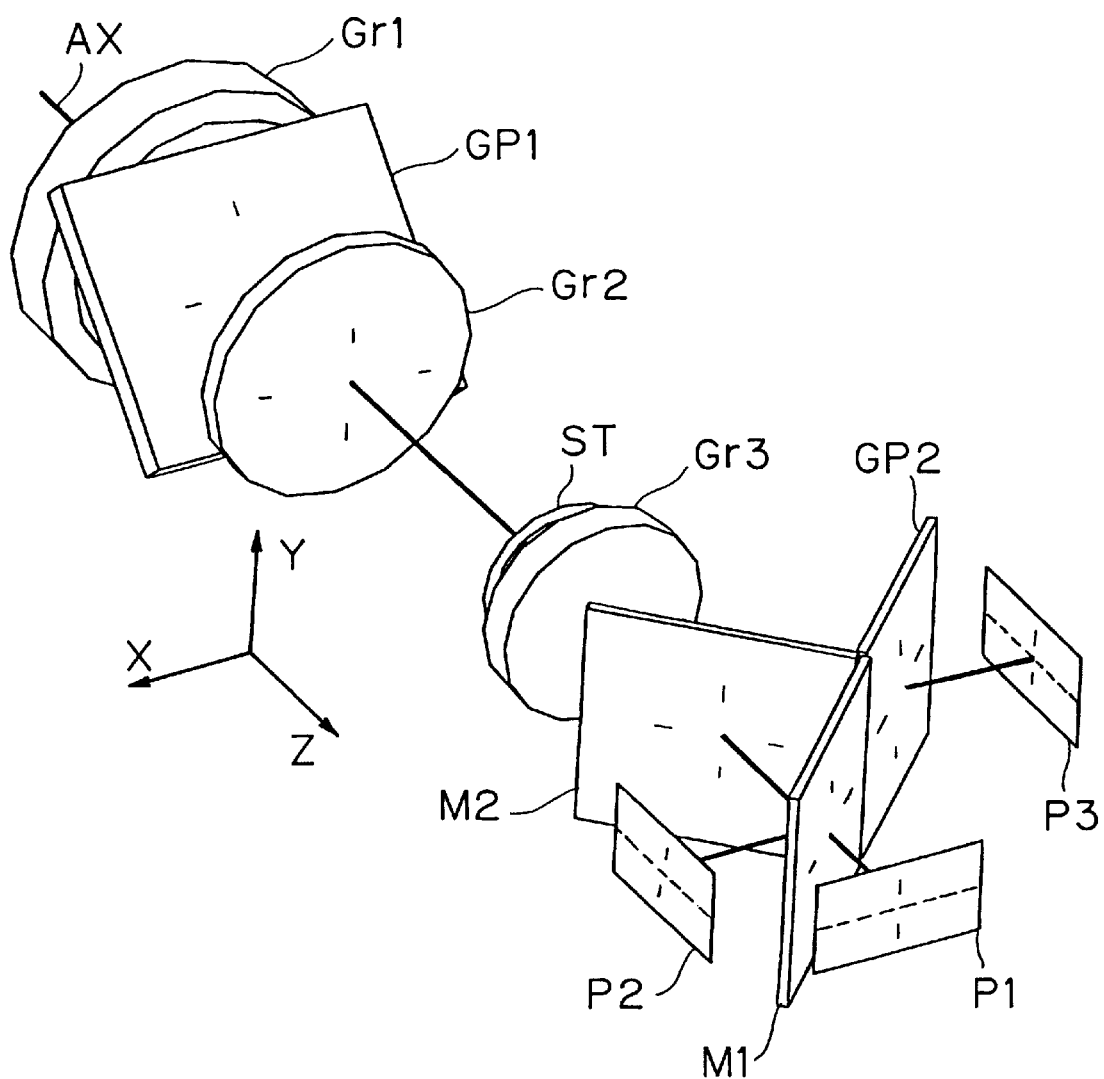
FIG. 2 is a perspective view illustrating the optical arrangement of the projecting optical system of the first embodiment (Example 1)

<First Embodiment (FIGS. 1 and 2>

FIG. 1 shows a section taken along the Y-Z plane of the projecting optical system of a first embodiment of the invention. FIG. 2 is a perspective view of the same projecting optical system. As shown in FIG. 1, the projecting optical system of the first embodiment is composed of a projection lens system (U1) and a color integrating mirror unit (U2). On the enlargement side of the projecting optical system (i.e. to the left of FIG. 1) is disposed a projection screen (not shown). On the reduction side of the projecting optical system are disposed three display panels (P1 to P3 ) (see FIG. 2). These display panels (P1 to P3 ) are transmission- or reflection-type liquid crystal display panels. The screen is placed where the images formed on the display panels (P1 to P3 ) are refocused, with enlargement, by the projection lens system (U1).

The color integrating mirror unit (U2) is composed of two color-integrating mirrors (M1 and M2) that integrate together the images displayed on the three display panels (P1 to P3) (see FIG. 2). Each of the color integrating mirrors (M1 and M2) is a dichroic mirror formed by cementing together two transparent flat glass plates (plane parallel glass plates) of an equal thickness made of an identical material, and has a dichroic surface formed by dichroic coating at the cementing interface between those two transparent base plates. The dichroic surface reflects a light component covering a specific wavelength range and transmits light components covering other wavelength ranges. Thus, the light rays exiting from the display panels (P1 to P3) are integrated together by being reflected from or transmitted through the two successively arranged dichroic surfaces. Both the light rays transmitted through the color integrating mirrors (M1 and M2) and the light rays reflected therefrom can be considered to pass through two flat glass plates. Accordingly, the light rays reflected from and transmitted through the color integrating mirrors (M1 and M2) are optically equivalent.

As will be understood from FIG. 2, the color integrating mirrors (M1 and M2) are so disposed as to be inclined with respect to the display panels (P1 to P3) and inclined in opposite directions about the axes substantially parallel to the Y direction. In other words, the color integrating mirrors (M1 and M2) are decentered with respect to the optical axis (AX) by being inclined about their respective axes, which are substantially parallel to the Y direction and which extend in the same direction, but being inclined in opposite directions with respect to the optical axis (AX). Decentering the two mirrors (M1 and M2 ) about axes extending in the same direction allows the optical axes (AX) of the three display panels (P1 to P3) to lie on the same plane (the X-Z plane). Thus, the three display panels (P1 to P3) all lie on the X-Z plane or in the vicinity thereof. This arrangement of the display panels (P1 to P3) facilitates the arrangement of an illumination optical system.

The light component exiting from the display panel (P1) is transmitted through the color integrating mirror (M1), and the light component exiting from the display panel (P2) is reflected from the color integrating mirror (M1). As a result, the images from the display panels (P1 and P2) are subjected to color integration. The light components thus integrated together then pass through the color integrating mirror (M2), are thereby subjected to further color integration with the light component exiting from the display panel (P3) and then reflected from the color integrating mirror (M2). Note that the light component exiting from the display panel (P3) passes through a dummy glass (GP2) before entering the color integrating mirror (M2). The dummy glass (GP2) is, like the color integrating mirror (M1), inclined about an axis substantially parallel to the Y direction (FIG. 2). Moreover, the dummy glass (GP2) is made of the same optical material as the flat glass plates constituting the color integrating mirrors (M1 and M2), and is as thick as two of such flat glass plates held together (i.e. as thick as each of the color integrating mirrors (M1 and M2)). Thus, the three light components exiting from the display panels (P1 to P3) are subjected to color integration as they travel along an optically identical optical path.

As shown in FIG. 1, the light having passed through the color integrating mirror unit (U2) enters the projection lens system (U1). The projection lens system (U1) projects a color-integrated image, obtained as a result of color integration achieved by the color integrating mirror unit (U2), onto a screen. The projection lens system (U1) is composed of, from the enlargement side (the screen side), a negatively-powered first lens unit (Gr1), a flat glass plate (GP1), a positively-powered second lens unit (Gr2), an aperture stop (ST), and a positively-powered third lens unit (Gr3). The flat glass plate (GP1) acts as a correcting member for correcting astigmatic difference, and is decentered by being so inclined as to have a twisted relationship with respect to the color integrating mirror unit (U2). That is, by being inclined about an axis substantially parallel to the X direction, the flat glass plate (GP1) is decentered so that the Y-Z plane including a normal to the flat glass plate (GP1) and the optical axis (AX) of the projection lens system (U1) is perpendicular to the X-Z plane including a normal to the color integrating mirrors (M1 and M2) and the optical axis (AX) of the projection lens system (U1).

In general, when light passes through an inclined flat glass plate, the focal points of the S (sagittal) and M (meridional) images deviate from each other in accordance with the thickness and the inclination angle of the flat glass plate. In the projecting optical system of the first embodiment, the light exiting from the display panels (P1 to P3) passes through two inclined flat glass plates (i.e. the color integrating mirrors (M1 and M2)) before entering the projection lens system (U1), and thus it is inevitable that the focal points of the S and M images significantly deviate from each other, causing astigmatic difference. To correct this, the projection lens system (U1) has an inclined flat glass plate (GP1) disposed therein. Specifically, whereas the color integrating mirrors (M1 and M2) are inclined about an axis substantially parallel to the Y direction, the flat glass plate (GP1) is inclined about an axis substantially parallel to the X direction. In this way, the two decentering axes extend in different directions. Thus, by optimizing the thickness of the flat glass plate (GP1), it is possible to make the focal points of the S and M images coincide. Note that, since the flat glass plate (GP1) is disposed between the lens units, there is no need to secure a longer back focal length than ever. This helps obtain satisfactory optical performance.

It is preferable that the direction of the axis about which the color integrating mirrors (M1 and M2) are decentered and the direction of the axis about which the flat glass plate (GP1) is decentered be perpendicular to each other (i.e., that the decentering axes be at an angle of 90° with respect to each other). This is because, by allowing light to pass through two flat glass plates inclined about the axes extending in directions perpendicular to each other, it is possible to make the focal points of the S and M images coincide for axial as well as off-axial rays. In contrast, in a case where the two decentering axes do not extend in directions perpendicular to each other, it is difficult to obtain the same effect. However, a similar effect can be obtained by placing the decentering axes in or close to a twisted relationship with respect to each other.

<Second Embodiment (FIGS. 3 and 4)>

Figure 3:
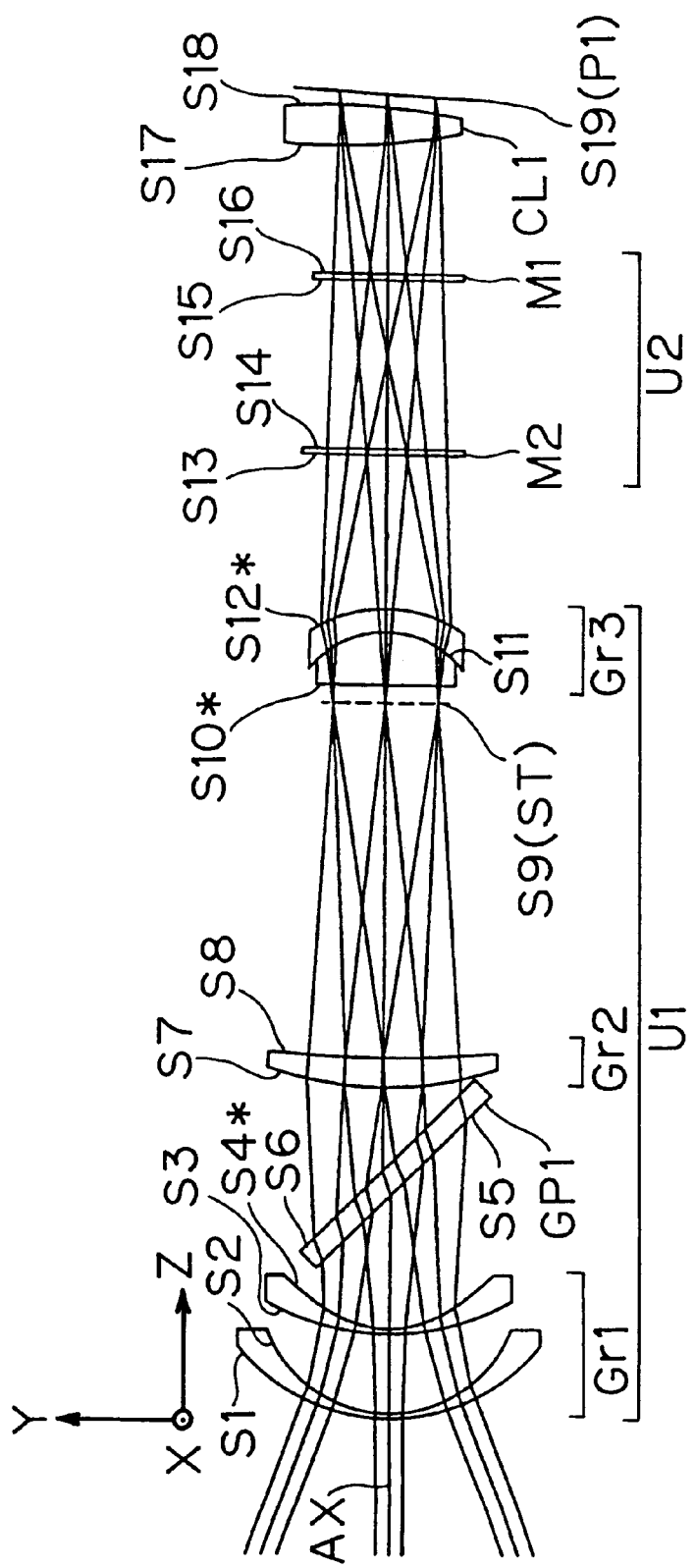
FIG. 3 is a sectional view illustrating the optical arrangement of the projecting optical system of a second embodiment (Example 2) according to the present invention.
Figure 4:
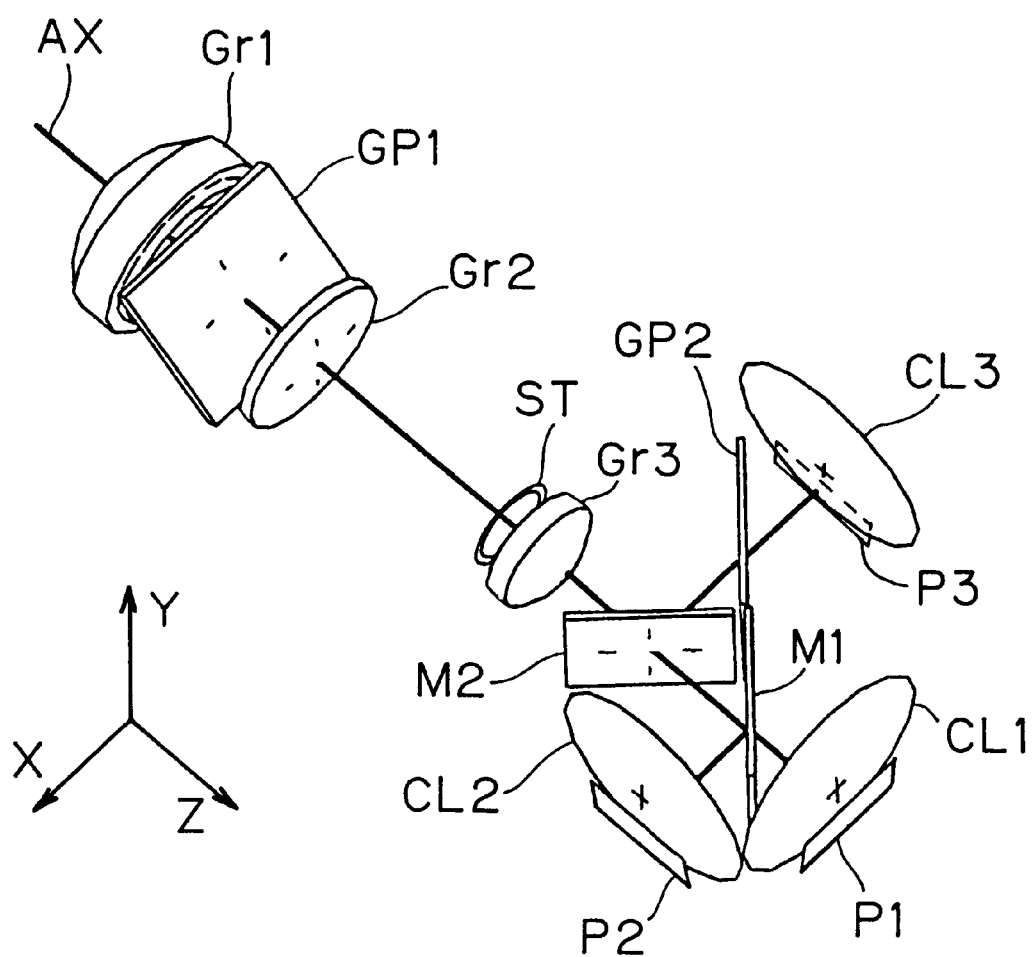
FIG. 4 is a perspective view illustrating the optical arrangement of the projecting optical system of the second embodiment (Example 2)

FIG. 3 shows a section taken along the Y-Z plane of the projecting optical system of a second embodiment of the invention, and FIG. 4 is a perspective view thereof. In the second embodiment, the projecting optical system additionally has decentered condenser lenses (CL1 to CL3) disposed immediately on the color-integrating-mirror-unit (U2) -side of the display panels (Pi to P3). This arrangement allows illumination light to be incident on the display panels (P1 to P3) at substantially the same angle for axial and off-axial rays. Thus, even in a case where liquid crystal light valves or the like that offer transmittance and contrast varying with the incident angle are employed as the display panels (P1 to P3), illumination light is incident on the central and peripheral portions of the display panels (P1 to P3) at only slightly different angles. This helps minimize uneven illumination and thereby obtain satisfactory contrast.

Moreover, the condenser lenses (CL1 to CL3) are significantly decentered in a direction substantially parallel to the Y direction (the direction substantially perpendicular to the direction in which the color integrating mirrors (M1 and M2) are inclined). In general, when a lens element disposed in the vicinity of an image plane is translationally decentered, the focal points of the S and M images deviate from each other in accordance with the optical power and the decentering amount of the lens element. The projecting optical system of the second embodiment exploits this effect. That is, according to the projecting optical system of the second embodiment, the astigmatic difference occurring in the color integrating mirrors (M1 and M2) can be corrected more effectively by the use of decentered condenser lenses (CL1 to CL3) and a flat glass plate (GP1). It is preferable that the decentering amount of the decentered condenser lenses (CL1 to CL3) be equal to or more than half its radius, i.e., that the condenser lenses (CL1 to CL3) be disposed with their optical axes passing outside the display areas of the display panels (P1 to P3). This makes it possible to use a single lens element as two equally-divided lens elements and thus achieve cost reduction.

<Third Embodiment (FIG. 5)>

Figure 5:
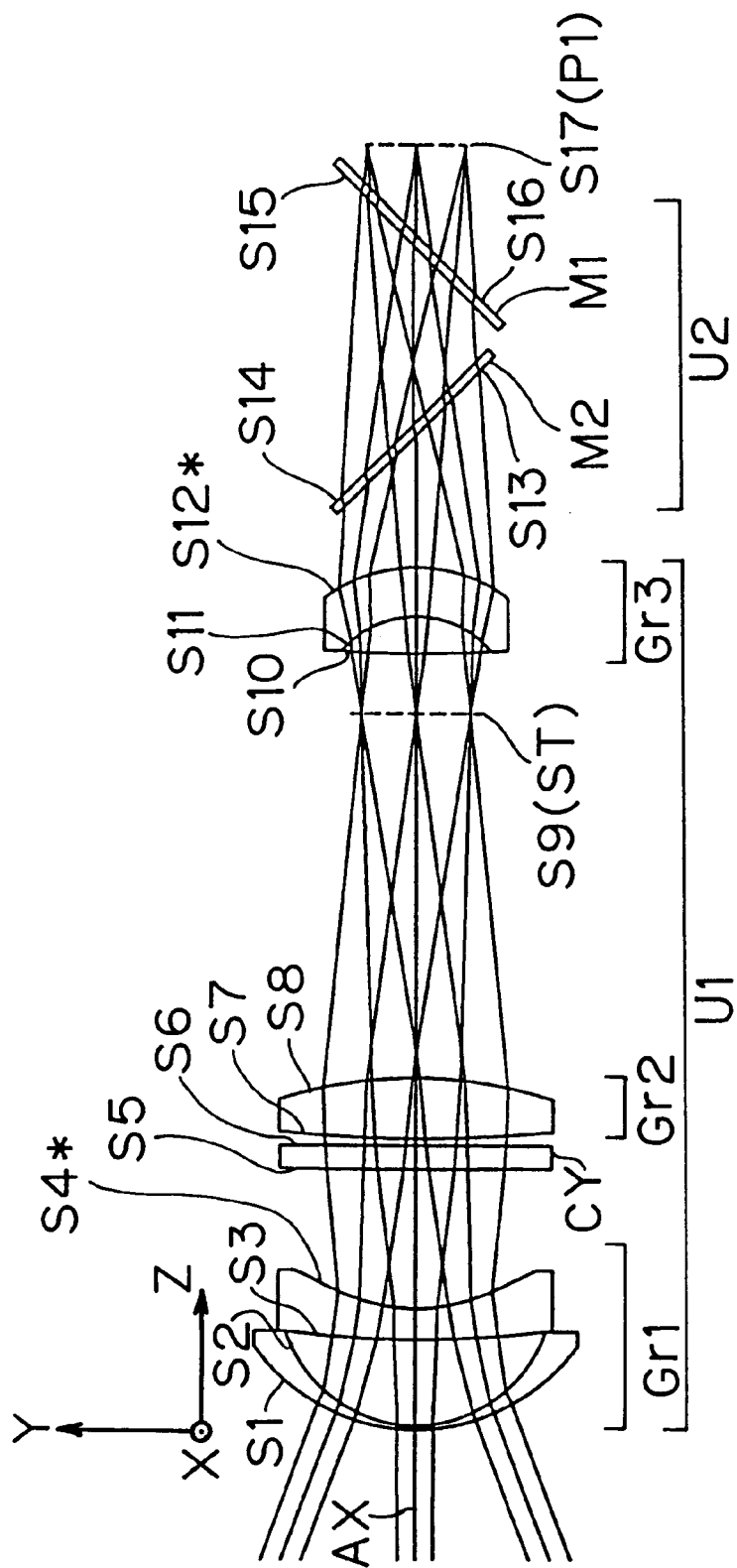
FIG. 5 is a sectional view illustrating the optical arrangement of the projecting optical system of a third embodiment (Example 3) according to the present invention.

FIG. 5 shows a section taken along the Y-Z plane of the projecting optical system of a third embodiment of the invention. In the third embodiment, the projecting optical system has a cylindrical lens (CY) acting as a correcting member disposed between a first and a second lens unit (Gr1 and Gr2). The cylindrical lens (CY) has a flat surface on one side and has a cylindrical curvature on the other side. In general, when light passes through a cylindrical lens, only the image points lying in the direction in which the cylindrical lens has a cylindrical curvature move (in the third embodiment, the image points move on the Y-Z section). Thus, aligning the direction of the surface having a cylindrical curvature with the M or S direction allows the focal points of the S and M images to be shifted. The projecting optical system of the third embodiment exploits this effect. That is, according to the projecting optical system of the third embodiment, the astigmatic difference occurring in the color integrating mirrors (M1 and M2) can be properly corrected by the use of the cylindrical lens (CY).

It is preferable that the direction in which the color integrating mirrors (M1 and M2) are inclined be parallel or perpendicular to the direction of the curvature of the cylindrical lens (CY). For example, in the third embodiment, the projecting optical system employs a convex lens element having a curvature on the Y-Z section. It is also possible to use instead a concave lens element having a curvature on the X-Z section. Moreover, it is preferable that, as in the third embodiment, a cylindrical lens (CY) be disposed within the projection lens system (U1) (i.e. between the lens units). This is because, disposing a cylindrical lens (CY) between a projection lens system (U1) and display panels (P1 to P3) necessitates a longer back focal length than ever, and thus makes it difficult to obtain satisfactory optical performance. Moreover, when the cylindrical lens (CY) is disposed between the projection lens system (U1) and the display panels (P1 to P3), it needs to have an unduly large radius of curvature and is thus difficult to manufacture. In contrast, when the cylindrical lens is disposed between the lens units, it can have a radius of curvature easy to manufacture. Note that, by disposing the cylindrical lens (CY) in a sufficiently large space originally left unused within the projecting optical system, it is possible to correct astigmatic difference properly without sacrificing the optical performance.

<Illumination Method Adopted in the Second Embodiment (FIGS. 6 to 8)>

Figure 6:
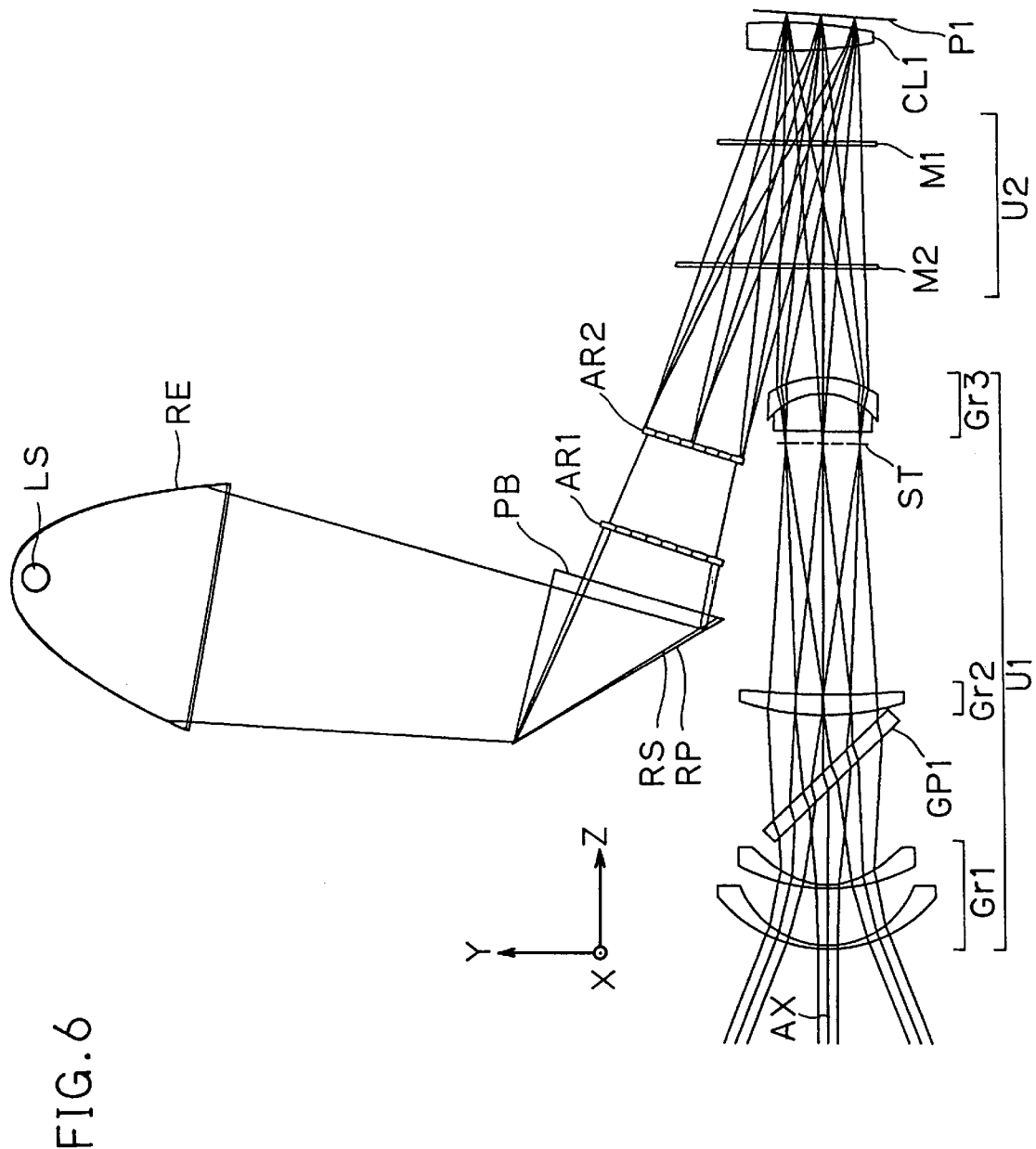
FIG. 6 is a sectional view illustrating the optical arrangement of the projecting optical system, and of the illumination optical system provided therein, of the second embodiment (Example 2)

FIG. 6 shows the illumination configuration of the projecting optical system of the second embodiment. Here, for simplicity's sake, the color integrating mirror unit (U2) is used also for color separation. The following description deals only with a light component of a color that is transmitted through the two color integrating mirrors (M1 and M2) and then enters the display panel (P1).

The light emitted from a light source (LS) is reflected from a reflector (RE) having a surface shaped as an ellipsoid of rotation. In order for the light exiting from the light source (LS) and then reflected from the reflector (RE) to be focused on the second focal point without suffering from aberrations, it is preferable that the light source (LS) be disposed at the first focal point of the ellipsoid-of-rotation surface. Moreover, the opening of the reflector (RE) is larger than that of the second lens array (AR2). Thus, as shown in FIG. 6, it is preferable to use a reflector (RE) having an ellipsoid-of-rotation surface that has a light-condensing ability. The light from the light source is, when reflected from the reflector (RE), condensed by its light-condensing action. Thus, the farther an optical element is placed away from the reflector (RE), the smaller the optical element can be. This helps reduce material and thus overall costs.

The light reflected from the reflector (RE) enters a polarized-light separating block (PB). The polarized-light separating block (PB) has a polarizing separating mirror surface (RS) and a mirror surface (RP) and is so disposed that these two surfaces (RS and RP) reflect light at different angles. When non-polarized light is incident on the polarized-light separating block (PB), only the S-polarized light component is reflected from the polarizing separating mirror surface (RS). The P-polarized light component is transmitted therethrough, is then reflected from the mirror surface (RP), and is then transmitted through the polarizing separating mirror surface (RS) once again so as to exit from the polarized-light separating block (PB). Thus, non-polarized light incident on the polarized-light separating block (PB) exits therefrom, with the S- and P-polarized light components exiting with different exiting angles.

The light exiting from the polarized-light separating block (PB) is transmitted through the first lens array (AR1) and then through the second lens array (AR2). The first lens array (AR1) is composed of an array (i.e. rows and columns) of quadrangular lens elements, each having a shape analogous to that of the display panel (P1). Moreover, the first lens array (AR1) serves to minimize the uneven illumination occurring in the display panel (P1) by dividing the light source (LS) into a plurality of plane light sources and then superimposing them together. Thus, the focal length of the first lens array (AR1) is so set that the light exiting from the reflector (RE) is focused at the second lens array (AR2). On the other hand, the focal length of the second lens array (AR2) is so set that the light source images divided by the first lens array (AR1) are superimposed together on the display panel (P1).

The P- and S-polarized light components enter the first lens array (AR1) at different angles. Consequently, on the second lens array (AR2) are formed the images of the P- and S-polarized light components. On the front (or rear) side of the second lens array (AR2), in the optical path of either the P- or S-polarized light component, is disposed a half-wave plate (not shown). This half-wave plate makes the polarization direction of the light rays emitted from the light source (LS) uniform.

Moreover, the second lens array (AR2) is disposed in a position conjugate with the aperture stop (ST) of the projecting optical system. This arrangement makes it possible to make the most of the light emitted from the light source (LS) for the illumination of the surface of the display panel (P1). Moreover, this arrangement eliminates the need to employ an optical system additionally such as a relay lens for illumination, and thus makes it possible to realize an illumination optical system composed of as few constituent components as possible. Thus, this arrangement contributes to cost reduction.

The light exiting from the second lens array (AR2) is separated into a plurality of light components of different colors by the color integrating mirror unit (U2). Then, of these light components thus separated, the light component transmitted through the color integrating mirror unit (U2) passes through the condenser lens (CL1) and then reaches the display panel (P1). The display panel (P1) is realized by the use of a reflection-type liquid crystal device. Here, only light modulated by the display panel (P1) is allowed to exit therefrom. The light exiting from the display panel (P1) passes through the condenser lens (CL1), is then subjected to color integration in the color integrating mirror unit (U2), and is then projected through the projection lens system (U1) to form an image on a screen.

As will be understood from FIG. 6, the second lens array (AR2) is disposed along the Y direction, immediately above the aperture stop (ST). The closer the second lens array (AR2) is to the aperture stop (ST), the smaller the color integrating mirrors (M1 and M2) can be made. Thus, as shown in FIG. 6, it is preferable that the second lens array (AR2) be disposed in the vicinity of the aperture stop (ST). Moreover, in a case where the display panel (P1) is rectangular, in order to place the second lens array (AR2) closer to the aperture stop (ST), it is preferable that the direction in which the optical path is turned on the display panel (P1) be aligned with the direction of the shorter sides of the display panel (P1).

Figure 7:
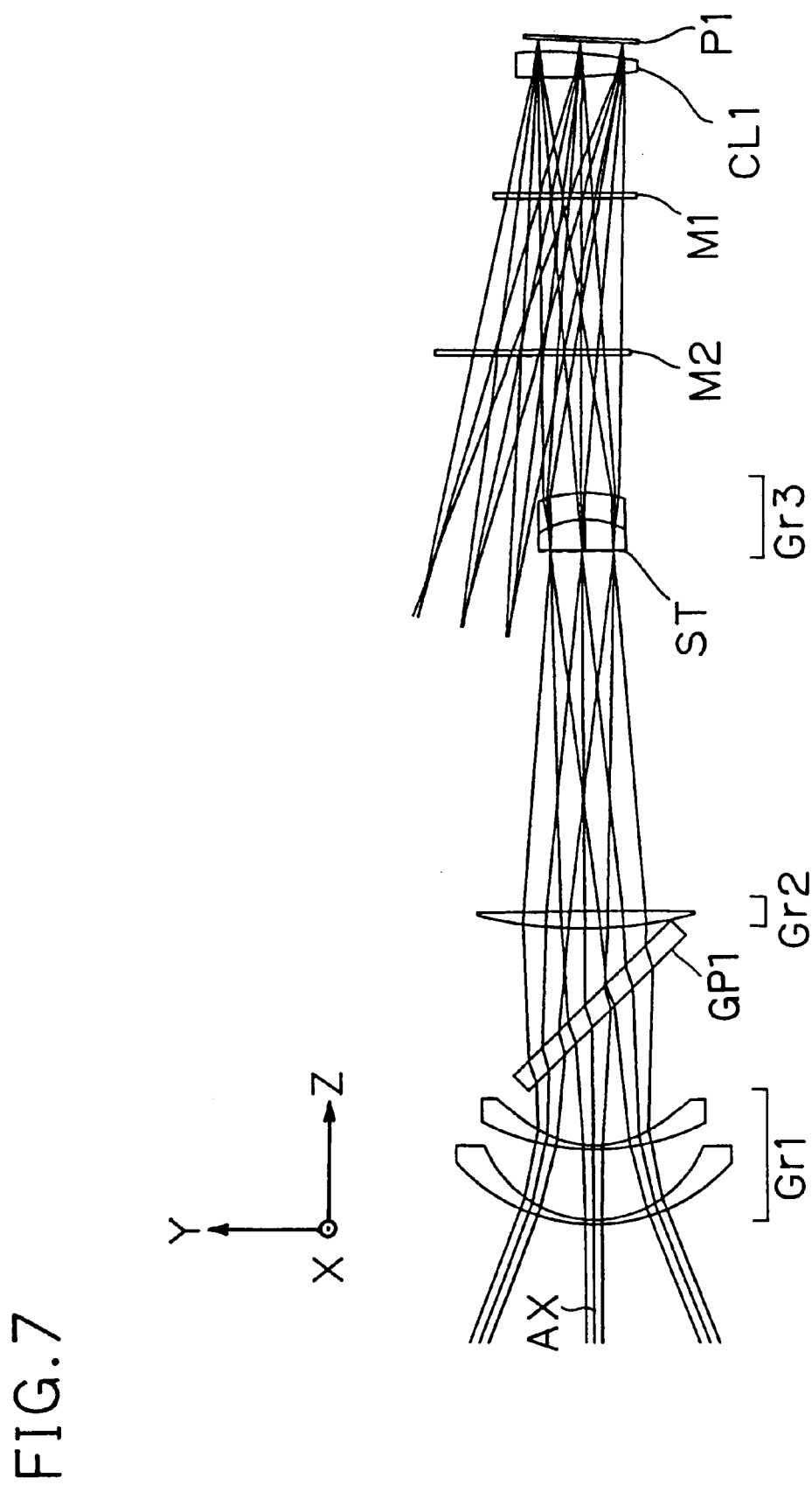
FIG. 7 is a sectional view illustrating a modified example of the optical arrangement of the projecting optical system of the second embodiment (Example 2)
Figure 8:
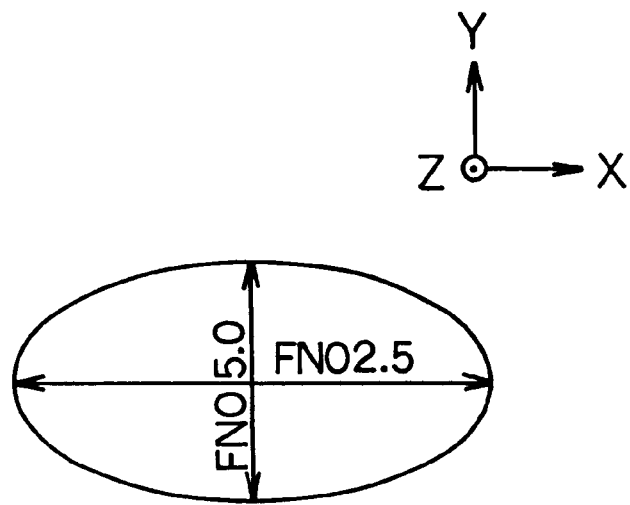
FIG. 8 is a sectional view illustrating the elliptic aperture stop provided in the projecting optical system shown in FIG. 7.

Moreover, it is preferable to change the shape of the aperture stop (ST) of the projecting optical system from a circle into an ellipse and to align the direction in which the optical path is turned on the display panel (P1) with the direction of the minor axis of the elliptic aperture stop. In this way, by the use of an elliptic aperture stop, it is possible to place the second lens array (AR2) close to the aperture stop (ST). FIG. 7 shows the Y-Z section where the second lens array (AR2) is placed closer to the aperture stop (ST) by the use of an elliptic aperture stop. Moreover, FIG. 8 is a diagram illustrating the shape of the elliptic aperture stop. Note that, in the optical arrangement of this projecting optical system, the F number is 5.0 in the Y direction, and 2.5 in the X direction.

Incidentally, as will be understood from FIG. 6, the color integrating mirrors (M1 and M2) transmit (or reflect, for the display panels (P2 and P3)) both the illumination light traveling from the light source (LS) to the display panel (P1) and the projection light traveling from the display panel (P1) to the projecting optical system. These two light beams are incident at significantly different angles on the two color integrating mirrors (M1 and M2) that are inclined in opposite directions for decentering. If polarized light is used as illumination light, the polarization axes in the color integrating mirrors (M1 and M2) are inclined so greatly with respect to a light component having a large incident angle that the polarization direction varies with the wavelength of the transmitted (or reflected) light, or elliptical polarization occurs. In a case where a liquid crystal display device is employed as the display panel (P1), a light component whose polarization direction has been changed and an elliptically polarized light component are cut off by the polarizing plate provided in the liquid crystal display device. This makes it impossible to obtain sufficiently high illumination efficiency and to achieve even color distribution in the projected image. In contrast, if non-polarized light is used as illumination light without disposing a polarization conversion block (PB) or the like in the optical path of the illumination light, no polarization axis exists, and thus, it is possible to solve such problems mentioned above, though with a slight loss in illumination efficiency.

<Illumination Method Adopted in the Third Embodiment (FIG. 9)>

Figure 9:
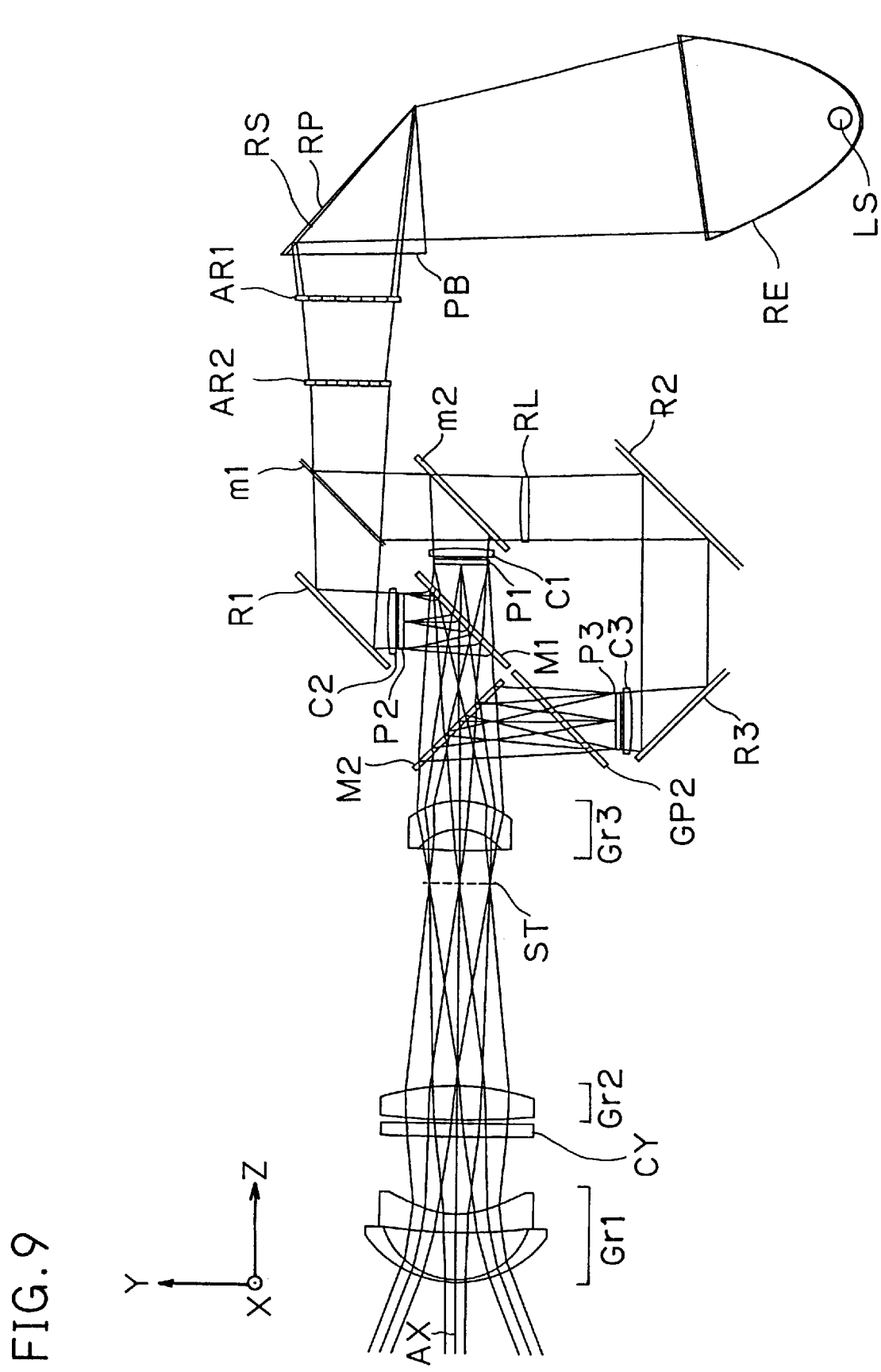
FIG. 9 is a sectional view illustrating the optical arrangement of the projecting optical system, and of the illumination optical system provided therein, of the third embodiment (Example 3).

FIG. 9 illustrates the illumination configuration of the projecting optical system of the third embodiment. In this embodiment, transmission-type display panels (P1 to P3) are employed. Only in this respect is the illumination configuration of the third embodiment different from that of the second embodiment. The light having exited from a light source (LS), and passed through a reflector (RE), a polarized-light separating block (PB), and a first and a second lens array (AR1 and AR2) in this order is separated into a plurality of light components of different colors by dichroic mirrors (m1 and m2). These light components then have their optical paths bent by reflecting mirrors (R1 to R3), are then condensed by condenser lenses (C1 to C3), and then individually reach the display panels (P1 to P3). The condenser lenses (C1 to C3) disposed immediately in front of the individual display panels (P1 to P3) serve to direct the illumination light to the projecting optical system as efficiently as possible. In addition, the light component traveling toward the display panel (P3) takes a different optical path. Thus, in order to illuminate the display panel (P3) properly, a relay lens (RL) is disposed in the optical path of the light component incident thereon.

In a projecting optical system employing transmission-type display panels (P1 to P3), the entire process, from illumination to projection, can be achieved on a single plane. Thus, in order to minimize the size of the color integrating mirrors (M1 and M2) of the projecting optical system and simultaneously to minimize the back focal length, it is preferable that the direction in which the optical path is turned on the color integrating mirrors (M1 and M2) be aligned with the direction of the shorter sides of the display panels (P1 to P3).

EXAMPLES

Hereinafter, the structure of the projecting optical systems embodying the present invention will be presented with reference to their construction data. Tables 1 to 3 list the construction data of Examples 1 to 3, which respectively correspond to the first to third embodiments described above. FIGS. 1, 3, and 5, which show the optical arrangement of the projecting optical systems of the first to third embodiments, respectively, illustrate the lens arrangement of Examples 1 to 3, respectively. In the construction data of each example, Si (i=0, 1, 2, 3, . . . ) represents the ith surface (OB: the object plane; IM: the image plane) counted from the enlargement side (i.e. the screen side), ri (i=0, 1, 2, 3, . . . ) represents the radius of curvature of the surface Si, di (i=0, 1, 2, 3, . . . ) represents the ith axial distance counted from the enlargement side (before decentering), and Ni (i=1, 2, 3, . . . ) and vi (i=1, 2, 3, . . . ) respectively represent the refractive index (Nd) for the d line and the Abbe number (vd) of the ith optical element counted from the enlargement side. Also listed in the construction data are the size of the display panels (P1 to P3) and the F-numbers (FNO).

A surface Si marked with an asterisk (*) is an aspherical surface, whose surface shape is defined by Formula (AS) below. Also listed together with the construction data are the aspherical surface data of each aspherical surface and other data.

$$X=(C \cdot Y^2)/(1+\sqrt{1-\epsilon \cdot C^2 \cdot Y^2})+(A \cdot Y^4+B \cdot Y^6+C \cdot Y^8+D \cdot Y^{10}+E \cdot Y^{12}) \quad (AS)$$

where

X represents the displacement from the references surface in the optical axis (AX) direction;

Y represents the height in a direction perpendicular to the optical axis (AX);

C represents the paraxial curvature;

$\epsilon$ represents the quadric surface parameter; and

A, B, C, D, and E represent the aspherical coefficients.

Moreover, a surface Si marked with # is the top surface of the decentered block with respect to the first surface (S1). Tables 4 to 6 list the data of the decentered block of Examples 1 to 3 (with respect to the first surface (S1)), respectively. In each table, X, Y, and Z represent the coordinates of the vertex of the top surface of the decentered block, with the origin, having coordinates (X, Y, Z)=(0, 0, 0), set at the vertex of the first surface (S1). Moreover, in each table, X-rotation represents the amount of decentering (°) by which the decentered block is inclined about the X axis (an axis parallel to the direction indicated as X) passing through the vertex of the top surface of the decentered block, and Y-rotation represents the amount of decentering (°) by which the decentered block is inclined about the Y axis (an axis parallel to the direction indicated as Y) passing through the vertex of the top surface thereof.

TABLE 1

<<Construction Data of Example 1>>

[Size of Display Panels] = 35 × 21 (mm)
FNO = 3.5

| Surface | Radium of Curvature | Axial Distance | Refractive Index | Abbe Number |
|---|---|---|---|---|
| S0 (OB) | r0 = ∞ | | | |
| | | d0 = 845.000 | | |
| S1 | r1 = 42.803 | | | |
| | | d1 = 1.400 | N1 = 1.8500 | ν1 = 40.04 |
| S2 | r2 = 28.930 | | | |
| | | d2 = 19.289 | | |
| S3 | r3 = 82.277 | | | |
| | | d3 = 1.400 | N2 = 1.8500 | ν2 = 40.04 |
| S4* | r4 = 33.300 | | | |
| | | d4 = — | | |
| S5# | r5 = ∞ | | | |
| | | d5 = 6.326 | N3 = 1.5168 | ν3 = 65.26 |
| S6 | r6 = ∞ | | | |
| | | d6 = — | | |
| S7# | r7 = 550.461 | | | |
| | | d7 = 9.702 | N4 = 1.60711 | ν4 = 34.01 |
| S8 | r8 = −103.841 | | | |
| | | d8 = 80.619 | | |
| S9 (ST) | r9 = ∞ | | | |
| | | d9 = — | | |
| S10*# | r10 = 868.469 | | | |
| | | d10 = 10.962 | N5 = 1.49028 | ν5 = 70.03 |
| S11 | r11 = −20.987 | | | |
| | | d11 = 6.590 | N6 = 1.84015 | ν6 = 23.66 |
| S12* | r12 = −31.465 | | | |
| | | d12 = — | | |
| S13# | r13 = ∞ | | | |
| | | d13 = 2.000 | N7 = 1.5168 | ν7 = 65.26 |
| S14 | r14 = ∞ | | | |
| | | d14 = — | | |
| S15# | r15 = ∞ | | | |
| | | d15 = 2.000 | N8 = 1.5168 | ν8 = 65.26 |
| S16 | r16 = ∞ | | | |
| | | d16 = — | | |
| S17# (IM) | r17 = ∞ | | | |

[Aspherical Surface Data of Fourth Surface (S4)]

$\epsilon = -6.003380$
$A = 0.176779 \times 10^{-4}$
$B = -0.301695 \times 10^{-7}$
$C = 0.315837 \times 10^{-10}$
$D = -0.179970 \times 10^{-13}$

[Aspherical Surface Data of Tenth Surface (S10)]

$\epsilon = 1.0$
$A = -0.510900 \times 10^{-5}$
$B = 0.809378 \times 10^{-8}$
$C = -0.799855 \times 10^{-10}$
$D = 0.249787 \times 10^{-12}$
$E = -0.385309 \times 10^{-15}$

[Aspherical Surface Data of Twelfth Surface (S12)]

$\epsilon = 1.0$
$A = -0.117624 \times 10^{-5}$
$B = 0.306988 \times 10^{-8}$
$C = -0.218337 \times 10^{-10}$
$D = 0.468098 \times 10^{-13}$
$E = -0.482617 \times 10^{-16}$

TABLE 2

<<Construction Data of Example 2>>

[Size of Display Panels] = 35 × 21 (mm)
FNO = 3.5

| Surface | Radium of Curvature | Axial Distance | Refractive Index | Abbe Number |
|---|---|---|---|---|
| S0 (OB) | r0 = ∞ | | | |
| | | d0 = 845.000 | | |
| S1 | r1 = 43.692 | | | |
| | | d1 = 1.200 | N1 = 1.7545 | ν1 = 51.57 |
| S2 | r2 = 29.309 | | | |
| | | d2 = 18.051 | | |
| S3 | r3 = 56.511 | | | |
| | | d3 = 1.200 | N2 = 1.7279 | ν2 = 52.51 |
| S4* | r4 = 23.350 | | | |
| | | d4 = — | | |
| S5# | r5 = ∞ | | | |
| | | d5 = 5.123 | N3 = 1.5168 | ν3 = 65.26 |
| S6 | r6 = ∞ | | | |
| | | d6 = — | | |
| S7# | r7 = 81.972 | | | |
| | | d7 = 6.675 | N4 = 1.7981 | ν4 = 22.61 |
| S8 | r8 = 253.744 | | | |
| | | d8 = 79.957 | | |
| S9 (ST) | r9 = ∞ | | | |
| | | d9 = — | | |
| S10*# | r10 = 434.664 | | | |
| | | d10 = 11.762 | N5 = 1.4883 | ν5 = 70.31 |
| S11 | r11 = −21.887 | | | |
| | | d11 = 5.146 | N6 = 1.8414 | ν6 = 24.09 |
| S12* | r12 = −32.115 | | | |
| | | d12 = — | | |
| S13# | r13 = ∞ | | | |
| | | d13 = 2.000 | N7 = 1.5168 | ν7 = 65.26 |
| S14 | r14 = ∞ | | | |
| | | d14 = — | | |
| S15# | r15 = ∞ | | | |
| | | d15 = 2.000 | N8 = 1.5168 | ν8 = 65.26 |
| S16 | r16 = ∞ | | | |
| | | d16 = — | | |
| S17# | r17 = 146.129 | | | |
| | | d17 = 9.111 | N9 = 1.5168 | ν9 = 65.26 |
| S18 | r18 = −142.263 | | | |
| | | d18 = — | | |
| S19# (IM) | r19 = ∞ | | | |

[Aspherical Surface Data of Fourth Surface (S4)]

$\epsilon = -0.271723$
$A = 0.513335 \times 10^{-5}$
$B = -0.361366 \times 10^{-8}$
$C = 0.374707 \times 10^{-11}$
$D = -0.869577 \times 10^{-14}$

[Aspherical Surface Data of Tenth Surface (S10)]

$\epsilon = 1.000000$
$A = -0.586218 \times 10^{-5}$
$B = 0.252558 \times 10^{-8}$
$C = -0.681401 \times 10^{-10}$
$D = 0.270385 \times 10^{-12}$
$E = -0.573136 \times 10^{-15}$

[Aspherical Surface Data of Twelfth Surface (S12)]

$\epsilon = 1.000000$
$A = -0.167743 \times 10^{-5}$
$B = 0.164845 \times 10^{-8}$
$C = -0.196774 \times 10^{-10}$
$D = 0.505318 \times 10^{-13}$
$E = -0.754412 \times 10^{-16}$

TABLE 3

<<Construction Data of Example 3>>

[Size of Display Panels] = 35 × 21 (mm)
FNO = 3.5

| Surface | Radius of Curvature | Axial Distance | Refractive Index | Abbe Number |
|---|---|---|---|---|
| S0 (OB) | r0 = ∞ | | | |
| | | d0 = 845.000 | | |
| S1 | r1 = 42.787 | | | |
| | | d1 = 1.100 | N1 = 1.8500 | ν1 = 40.04 |
| S2 | r2 = 29.468 | | | |
| | | d2 = 18.177 | | |
| S3 | r3 = 216.282 | | | |
| | | d3 = 6.690 | N2 = 1.72679 | ν2 = 52.55 |
| S4* | r4 = 35.696 | | | |
| | | d4 = 29.796 | | |
| S5 | r5 (Y Direction) = 1385.724 | | | |
| | r5 (X Direction) = ∞ | | | |
| | | d5 = 5.187 | N3 = 1.5168 | ν3 = 65.26 |
| S6 | r6 = ∞ | | | |
| | | d6 = 1.365 | | |
| S7 | r7 = 300.184 | | | |
| | | d7 = 13.000 | N4 = 1.6924 | ν4 = 27.01 |
| S8 | r8 = −97.340 | | | |
| | | d8 = 77.470 | | |
| S9 (ST) | r9 = ∞ | | | |
| | | d9 = 13.122 | | |
| S10 | r10 = 171.741 | | | |
| | | d10 = 8.193 | N5 = 1.4932 | ν5 = 69.61 |
| S11 | r11 = −20.675 | | | |
| | | d11 = 10.684 | N6 = 1.7985 | ν6 = 22.60 |
| S12* | r12 = −32.614 | | | |
| | | d12 = — | | |
| S13# | r13 = ∞ | | | |
| | | d13 = 2.000 | N7 = 1.5168 | ν7 = 65.26 |
| S14 | r14 = ∞ | | | |
| | | d14 = — | | |
| S15# | r15 = ∞ | | | |
| | | d15 = 2.000 | N8 = 1.5168 | ν8 = 65.26 |
| S16 | r16 = ∞ | | | |
| | | d16 = — | | |
| S17#(IM) | r17 = ∞ | | | |

[Aspherical Surface Data of Fourth Surface (S4)]

$\epsilon = -5.778788$
$A = 0.133612 \times 10^{-4}$
$B = -0.229618 \times 10^{-7}$
$C = 0.226014 \times 10^{-10}$
$D = -0.125060 \times 10^{-13}$

[Aspherical Surface Data of Twelfth Surface (S12)]

$\epsilon = 1.0$
$A = -0.242018 \times 10^{-5}$
$B = -0.901803 \times 10^{-8}$
$C = 0.604584 \times 10^{-10}$
$D = -0.161700 \times 10^{-12}$
$E = 0.160259 \times 10^{-15}$

TABLE 4

<Data of Decentered Block of Example 1 {with respect to the First Surface (S1)}>

| Surface | X | Y | Z | X-Rotation | Y-Rotation |
|---|---|---|---|---|---|
| S5 | 0 | 0 | 52.0887 | 45 | 0 |
| S7 | −0.0034 | 2.99481 | 82.298 | −0.5329 | 0.0109 |
| S10 | −0.0136 | 1.5671 | 182.54 | −0.644 | 0.0194 |
| S13 | −0.0314 | 0.97645 | 235.089 | −0.644 | 45.0194 |
| S15 | −0.0449 | 0.52688 | 275.086 | −0.644 | −44.981 |
| S17 | −0.0555 | 0.17737 | 306.181 | 0.0939 | 0.011 |

TABLE 5

<Data of Decentered Block of Example 2 {with respect to the First Surface (S1)}>

| Surface | X | Y | Z | X-Rotation | Y-Rotation |
|---|---|---|---|---|---|
| S5 | 0 | 0 | 50.4514 | 45 | 0 |
| S7 | 0.05246 | 1.49641 | 75.3374 | −0.4876 | 0.1186 |
| S10 | 0.0378 | 0.67825 | 166.081 | −0.7266 | 0.0955 |
| S13 | −0.0487 | 0.01996 | 217.985 | −0.7271 | 45.0955 |
| S15 | −0.1154 | −0.4873 | 257.981 | −0.7261 | −44.905 |
| S17 | −1.0648 | 12.2316 | 288.496 | −0.4876 | 0.1186 |
| S19 | −0.1852 | −1.0190 | 299.900 | −3.9636 | −0.2632 |

TABLE 6

<Data of Decentered Block of Example 3 {with respect to the First Surface (S1)}>

| Surface | X | Y | Z | X-Rotation | Y-Rotation |
|---------|---|---|---------|------------|------------|
| S13 | 0 | 0 | 212.783 | 45 | 0 |
| S15 | 0 | 0 | 252.783 | −45 | 0 |
| S17 | 0 | 0 | 254.783 | 0 | 0 |

What is claimed is:

1. A projecting optical system comprising:

a plurality of display panels;

a color integrating mirror, disposed at an angle to any of the display panels, for integrating images displayed on the display panels into a single color-integrated image by reflecting a light component covering a specific wavelength range and transmitting light components covering other wavelength ranges than the specific wavelength range;

a projection optical system for projecting the color-integrated image onto a screen;

a correcting member, disposed within the projection optical system, for correcting at least a portion of an astigmatic difference caused by the color integrating mirror; and a lens member, disposed on a color-integrating-mirror side of the correcting member disposed within the projection optical system, for further correcting the astigmatic difference caused by the color integrating mirror.

2. A projecting optical system as claimed in claim 1, wherein the color integrating mirror is composed of at least one dichroic mirror having a dichroic surface sandwiched between transparent base plates.

3. A projecting optical system as claimed in claim 1, wherein the correcting member is a flat plate and is decentered by being so inclined that a plane including a normal to the correcting member and an optical axis of the projection optical system is perpendicular to a plane including a normal to the color integrating mirror and the optical axis of the projection optical system.

4. A projecting optical system as claimed in claim 1, wherein the lens member is a decentered condenser lens.

5. A projecting optical system as claimed in claim 4, wherein the condenser lens is decentered in a direction substantially perpendicular to a direction in which the color integrating mirror is inclined, and has an optical axis passing outside display areas of the display panels.

6. A projector comprising:

a light source unit for emitting white light;

a color separating unit for separating the white light emitted from the light source unit into a plurality of light components of different colors corresponding to different wavelength ranges;

a plurality of display panels illuminated individually by the light components of different colors thus separated;

a color integrating mirror, disposed at an angle to any of the display panels, for integrating images displayed on the display panels into a single color-integrated image by reflecting a light component covering a specific wavelength range and transmitting light components covering other wavelength ranges than the specific wavelength range;

a projection optical system for projecting the color-integrated image onto a screen;

a correcting member, disposed within the projection optical system, for correcting at least a portion of an astigmatic difference caused by the color integrating mirror; and a lens member, disposed on a color-integrating-mirror side of the correcting member disposed within the projection optical system, for further correcting the astigmatic difference caused by the color integrating mirror.

7. A projecting optical system as claimed in claim 6, wherein the color integrating mirror is composed of at least one dichroic mirror having a dichroic surface sandwiched between transparent base plates.

8. A projecting optical system as claimed in claim 6, wherein the correcting member is a flat plate and is decentered by being so inclined that a plane including a normal to the correcting member and an optical axis of the projection optical system is perpendicular to a plane including a normal to the color integrating mirror and the optical axis of the projection optical system.

9. A projecting optical system as claimed in claim 6, wherein the lens member is a decentered condenser lens.

10. A projecting optical system as claimed in claim 9, wherein the condenser lens is decentered in a direction substantially perpendicular to a direction in which the color integrating mirror is inclined, and has an optical axis passing outside display areas of the display panels.

11. A projecting optical system comprising:

a plurality of display panels;

a color integrating mirror, disposed at an angle to any of the display panels, for integrating images displayed on the display panels into a color-integrated image;

a projection optical system for projecting the color-integrated image onto a screen; and a correcting member, disposed within the projection optical system, for correcting an astigmatic difference in the color-integrated image.

12. A projecting optical system as claimed in claim 11, wherein the color integrating mirror is composed of at least one dichroic mirror having a dichroic surface sandwiched between transparent base plates.

13. A projecting optical system as claimed in claim 11, wherein the correcting member is a flat plate and is decentered by being so inclined that a plane including a normal to the correcting member and an optical axis of the projection optical system is perpendicular to a plane including a normal to the color integrating mirror and the optical axis of the projection optical system.

14. A projecting optical system as claimed in claim 11, wherein the correcting member is a cylindrical lens.

15. A projector comprising:

a light source unit for emitting white light;

a color separating unit for separating the white light emitted from the light source unit into a plurality of light components;

a plurality of display panels illuminated individually by the light components;

a color integrating mirror, disposed at an angle to any of the display panels, for integrating images displayed on the display panels into a color-integrated image;

a projection optical system for projecting the color-integrated image onto a screen; and a correcting member, disposed within the projection optical system, for correcting an astigmatic difference caused by the color integrating mirror.

16. A projecting optical system as claimed in claim 15, wherein the color integrating mirror is composed of at least one dichroic mirror having a dichroic surface sandwiched between transparent base plates.

17. A projecting optical system as claimed in claim 15, wherein the correcting member is a flat plate and is decentered by being so inclined that a plane including a normal to the correcting member and an optical axis of the projection optical system is perpendicular to a plane including a normal to the color integrating mirror and the optical axis of the projection optical system.

18. A projecting optical system as claimed in claim 15, wherein the correcting member is a cylindrical lens.

* * * * *